US012602911B2

(12) United States Patent
Tu et al.

(10) Patent No.: US 12,602,911 B2
(45) Date of Patent: Apr. 14, 2026

(54) SYSTEMS AND METHODS FOR HANDWRITING RECOGNITION USING OPTICAL CHARACTER RECOGNITION

(71) Applicants: Harry Tu, Pleasanton, CA (US); Wei Zhu, Beijing (CN)

(72) Inventors: Harry Tu, Pleasanton, CA (US); Wei Zhu, Beijing (CN)

(73) Assignees: Harry Tu, Pleasanton, CA (US); Wei Zhu, Beijing (CN)

( * ) Notice: Subject to any disclaimer, the term of this patent is extended or adjusted under 35 U.S.C. 154(b) by 293 days.

(21) Appl. No.: 18/243,512

(22) Filed: Sep. 7, 2023

(65) Prior Publication Data

US 2024/0412492 A1     Dec. 12, 2024

Related U.S. Application Data

(60) Provisional application No. 63/471,380, filed on Jun. 6, 2023.

(51) Int. Cl.
| | |
|---|---|
| *G06V 10/776* | (2022.01) |
| *G06Q 20/20* | (2012.01) |
| *G06Q 20/42* | (2012.01) |
| *G06V 10/94* | (2022.01) |
| *G06V 30/14* | (2022.01) |
| *G06V 30/148* | (2022.01) |
| *G06V 30/224* | (2022.01) |

(52) U.S. Cl.
CPC ........... *G06V 10/776* (2022.01); *G06Q 20/20* (2013.01); *G06Q 20/42* (2013.01); *G06V 10/95* (2022.01); *G06V 30/1448* (2022.01);

*G06V 30/1456* (2022.01); *G06V 30/153* (2022.01); *G06V 30/224* (2022.01)

(58) Field of Classification Search
None
See application file for complete search history.

(56) References Cited

U.S. PATENT DOCUMENTS

| | | | |
|---|---|---|---|
| 2015/0254627 A1* | 9/2015 | Bell ..................... | G06Q 20/204 |
| | | | 705/24 |
| 2020/0372278 A1* | 11/2020 | Iwamura .............. | G06V 30/155 |

* cited by examiner

*Primary Examiner* — Edward Park
(74) *Attorney, Agent, or Firm* — Fish & Richardson P.C.

(57) ABSTRACT

The present disclosure relates to systems, software, and computer-implemented methods for automatically identifying handwritten tips. An example method includes obtaining an image of a receipt, where the image includes a reference region in a pre-set format, a plurality of category identifiers, and at least one set of handwritten characters. The reference region and the plurality of category identifiers can be printed. The plurality of category identifiers can be located at pre-set positions relative to the reference region. The method further includes obtaining optical character recognition (OCR) information of the image and identifying the reference region from the OCR information based on the pre-set format of the reference region. The method further includes determining a plurality of amounts based on the OCR information and the reference region, where at least one of the plurality of amounts is associated with a tip category.

19 Claims, 5 Drawing Sheets

SYSTEMS AND METHODS FOR HANDWRITING RECOGNITION USING OPTICAL CHARACTER RECOGNITION

CROSS-REFERENCE TO RELATED APPLICATIONS

This application claims the benefit of U.S. Provisional Application Ser. No. 63/471,380 filed on Jun. 6, 2023, the entire contents of which are hereby incorporated by reference in its entirety.

TECHNICAL FIELD

This disclosure generally relates to handwriting recognition.

BACKGROUND

In restaurants and other service establishments, customers typically write tip amounts on and sign a receipt. A service staff may also enter the tip amount again in the point of sale (POS) system or into a separate entry system, which may be time-consuming, prone to errors, and may lead to staff fraud. In some implementations, existing optical character recognition (OCR) technology cannot accurately identify the handwritten tip amounts on the receipt. Although the OCR model can distinguish between handwritten and printed fonts, accuracy of such solutions is not high. The handwriting of the tip amount written by the customer on the receipt may be illegible or sloppy, leading to low OCR recognition rates. Therefore, better solutions to quickly scan and recognize tip amount into the order record of the POS system are desired.

SUMMARY

The present disclosure involves systems, software, and computer-implemented methods that use AI OCR technology to automatically identify handwritten tips. An example method includes obtaining an image of a receipt, where the image includes a reference region in a pre-set format, a plurality of category identifiers, and at least one set of handwritten characters. The reference region and the plurality of category identifiers can be printed. The plurality of category identifiers can be located at pre-set positions relative to the reference region. The method further includes obtaining optical character recognition (OCR) information of the image and identifying the reference region from the OCR information based on the pre-set format of the reference region. The method further includes determining a plurality of amounts based on the OCR information and the reference region, where at least one of the plurality of amounts is associated with a tip category. The method further includes validating the at least one of the plurality of amounts associated with the tip category based on at least one of a set of validation rules and storing the at least one of the plurality of amounts associated with the tip category into a point of sale (POS) system. In some instances, the obtaining OCR information of the image includes one of the following: determining the OCR information of the image by processing the image using an artificial intelligence (AI) OCR model; or sending the image to a cloud OCR server and receiving the OCR information of the image from the cloud OCR server.

In some instances, the OCR information includes a plurality of recognition results, where each recognition result of the plurality of recognition results includes a set of recognized characters or a machine-readable code, and where the OCR information further includes a position, a confidence level, and a type indicator for each recognition result of the plurality of recognition results. In some of those instances, the pre-set format includes at least one of the following: the reference region is located at a predetermined position or within a predetermined area in the image; or the reference region includes pre-set reference information, where the pre-set reference information includes at least one of a sequence of pre-set characters, a sequence of pre-set numbers, or a pre-set machine-readable code. In some of those instances, identifying the reference region from the OCR information includes selecting a recognition result from the plurality of recognition results as the reference region based on at least one of: whether the recognition result is located at the predetermined position or within the predetermined area corresponding to the reference region; or whether the recognition result includes the pre-set reference information corresponding to the reference region.

In some instances, the determining a plurality of amounts includes: identifying each category identifier of the plurality of category identifiers from the OCR information; and for each category identifier, determining an amount associated with the category identifier by selecting a recognition result from the plurality of recognition results based on at least one of the following: whether the recognition result includes a set of characters indicating a number; whether the recognition result includes multiple printed tip suggestions and a handwritten symbol indicating that one of the multiple printed tip suggestions is selected; whether the recognition result is handwritten; whether the recognition result is within a region determined based on a position of the reference region and the pre-set positions of the plurality of category identifiers relative to the reference region; or whether a distance between the recognition result and the category identifier is less than a threshold.

In some instances, the plurality of amounts includes: a tip amount associated with the tip category; a purchase amount associated with a purchase category; and a total amount associated with a total category. In some of those instances, the plurality of category identifiers includes: a category identifier of the tip category; a category identifier of the purchase category; and a category identifier of the total category. In some of those instances, the at least one set of handwritten characters includes a first set of handwritten numbers indicating the tip amount and a second set of handwritten numbers indicating the total amount. In some of those instances, the set of validation rules includes: the purchase amount, the tip amount, and the total amount are larger than zero; the purchase amount plus the tip amount equals the total amount; and the tip amount is within a threshold percentage of the purchase amount. In some of those instances, the method further includes requesting a manual confirmation upon determining that the tip amount exceeds the threshold percentage of the purchase amount. In some of those instances, the requesting a manual confirmation includes: sending the purchase amount, the tip amount, and the total amount to a user interface; and receiving the manual confirmation from the user interface. In some of those instances, the validating the at least one of the plurality of amounts associated with the tip category based on at least one of a set of validation rules includes: updating the tip amount upon determining that the plurality of amounts violates at least one of the set of validation rules. In some of those instances, the updating the tip amount includes updating the tip amount as the total amount subtracted by the purchase amount.

In some instances, the determining a plurality of amounts further includes determining a confidence level of the tip amount, and the validating the at least one of the plurality of amounts associated with the tip category further includes updating the confidence level of the tip amount. In those instances, the method further includes: sending the tip amount to a user interface for confirmation in response to determining that the confidence level of the tip amount is below a threshold; and updating the tip amount based on feedback received from the user interface.

In some instances, the reference region further includes an order number, and the storing the at least one of the plurality of amounts associated with the tip category into a POS system includes: storing the tip amount and the order number into the POS system.

In some instances, the obtaining an image of a receipt includes: taking an initial digital image of the receipt using a camera or a scanner; and processing the initial digital image by correcting a distortion of the initial digital image to determine the image.

An example merchant system includes at least one processor and at least one memory coupled to the at least one processor. The at least one memory can store programming instructions for execution by the at least one processor to cause the merchant system to perform operations including obtaining an image of a receipt, where the image includes a reference region in a pre-set format, a plurality of category identifiers, and at least one set of handwritten characters. The reference region and the plurality of category identifiers can be printed, and the plurality of category identifiers can be located at pre-set positions relative to the reference region. The operations further include obtaining OCR information of the image and identifying the reference region from the OCR information based on the pre-set format of the reference region. The operations further include determining a plurality of amounts based on the OCR information and the reference region, where at least one of the plurality of amounts is associated with a tip category. The operations further include validating the at least one of the plurality of amounts associated with the tip category based on at least one of a set of validation rules and storing the at least one of the plurality of amounts associated with the tip category into a POS system.

In some instances, the obtaining OCR information of the image includes one of the following: determining the OCR information of the image by processing the image using an AI OCR model; or sending the image to a cloud OCR server and receiving the OCR information of the image from the cloud OCR server.

An example non-transitory computer storage medium can be coupled to at least one processor of a merchant system and can store programming instructions for execution by the at least one processor to cause the merchant system to perform operations including obtaining an image of a receipt, where the image includes a reference region in a pre-set format, a plurality of category identifiers, and at least one set of handwritten characters. The reference region and the plurality of category identifiers can be printed, and the plurality of category identifiers can be located at pre-set positions relative to the reference region. The operations further include obtaining OCR information of the image and identifying the reference region from the OCR information based on the pre-set format of the reference region. The operations further include determining a plurality of amounts based on the OCR information and the reference region, where at least one of the plurality of amounts is associated with a tip category. The operations further include validating the at least one of the plurality of amounts associated with the tip category based on at least one of a set of validation rules and storing the at least one of the plurality of amounts associated with the tip category into a POS system.

DETAILED DESCRIPTION

Figure 1:
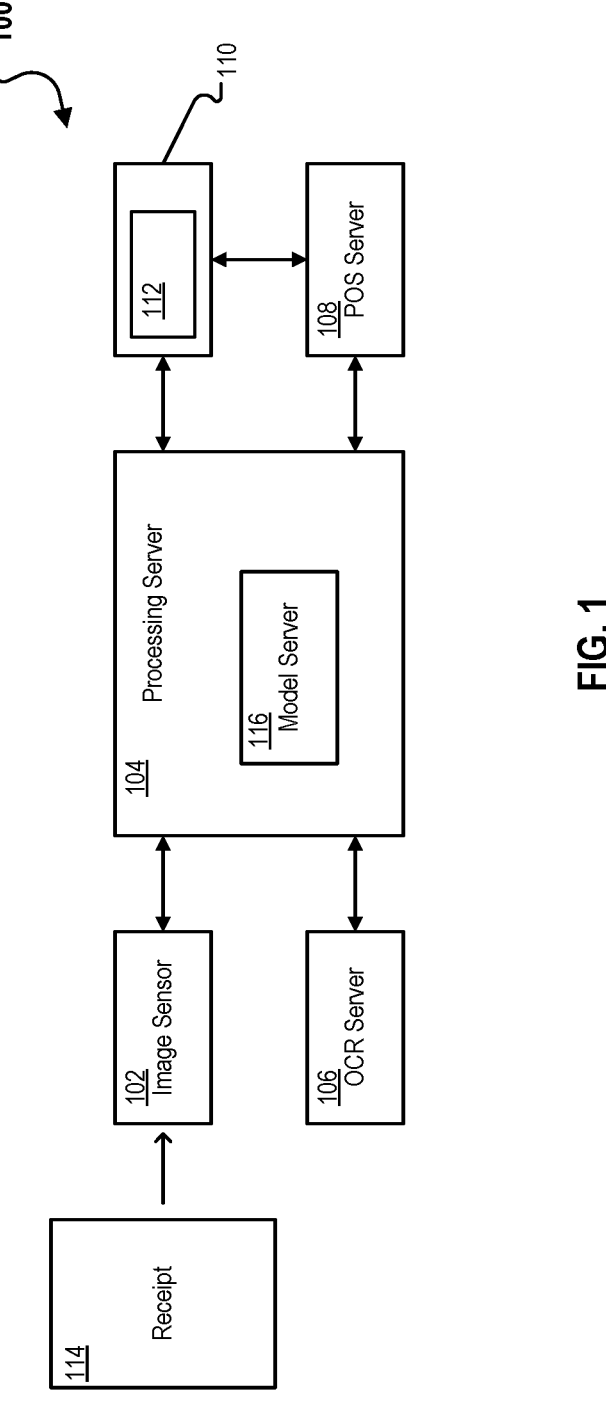
FIG. 1 is an architecture diagram illustrating an example system, in accordance with implementations of the present disclosure.

The present disclosure relates to systems and methods that use artificial intelligence (AI) optical character recognition (OCR) technology to automatically identify handwritten sections of printed or handwritten documents. In one example, a merchant may manually determine an amount of a gratuity (also called a tip) based on a customer's handwritten tip and total in a dedicated section of a receipt. When paying a tip to the merchant for a transaction (such as a meal at a restaurant or a taxi fare), the customer may use a credit card and write an amount for the tip on a receipt of the transaction provided by the merchant. Then, the customer may physically sign the receipt to confirm a total amount to be charged to the credit card. Later, the merchant may manually inspect the receipt, identify the tip amount and a corresponding transaction identifier on the receipt, and then enter the tip amount into their transaction processing system (such as a POS system or a separate entry system) for correlation to the transaction.

The traditional tip processing procedure may be time-consuming, prone to errors, and may lead to staff fraud. In some instances, an employee of the merchant may enter an amount larger than the actual tip during the manual tip processing procedure. The employee may either have intended to deceive the merchant or, more likely, have simply made a mistake by entering a wrong number. Regardless of whether the employee's action was fraudulent or mistaken, it may be difficult for the merchant to detect these inaccuracies. Furthermore, even if the merchant could find errors in the tip amounts, the merchant would have to adjust those incorrect tips and refund an excess back to the customer later, which may still cause dissatisfaction of the customer. Similarly, if a customer complains or disputes the charge due to incorrect entry, similar actions must still be taken.

In other instances, OCR-based systems may evaluate receipts in an attempt to automatically identify and assign gratuity and tips to transactions. However, existing OCR technology cannot accurately identify the handwritten tip amounts on the receipt. Even though the OCR model may distinguish handwritten text (or font) from printed text, the customer's handwriting of the tip amount on the receipt may be illegible or sloppy, leading to low OCR recognition rates. Therefore, better solutions that allow quicker scan and more accurate tip amount recognition are desired.

The present disclosure provides systems and methods based on an AI-enhanced OCR technology for automatic identification of handwritten tip amounts on receipts. The use of OCR to recognize the receipt image avoids the issues associated with a manual system input, including typographical errors, potential fraud, and time-consuming data entry. The proposed systems and methods are based on deep learning models that can distinguish between printed and handwritten fonts, and thus may accurately recognize text on the receipt, provide information on the text position and size to the system, and determine the amounts to be considered from the recognized text and its relative positioning on the receipt.

In one example implementation, a method includes obtaining an image of a receipt, where the image includes a reference region in a pre-set format, category identifiers, and a set of handwritten characters. The reference region and the category identifiers can be printed. The category identifiers are located at pre-set positions relative to the reference region. The method further includes obtaining OCR information of the image, which may include performing an OCR process on the image, and identifying the reference region from the OCR information based on the pre-set format of the reference region. The method further includes determining handwritten amounts based on the OCR information and the reference region. One of the amounts is associated with a tip category. The method further includes validating the amounts based on one or more validation rules. The method further includes storing the amount associated with the tip category into a POS system.

The subject matter described in this disclosure can be implemented to realize one or more of the following advantages.

First, the proposed solution is more efficient. Currently, handwritten tips may still be entered manually. That is, an employee of a merchant holds the receipt in one hand and operates the POS machine in the other hand. The employee then searches for the order on the POS machine, opens the order editing interface, enters the tip amount, and clicks a "save" button. Then the employee moves on to process the tips for the next order. The time taken to enter a tip can be about 30 to 60 seconds, depending on the convenience of the POS system. However, it may take only two seconds, or the amount of time to obtain an image of the receipt, for the proposed solution to process each tip on a receipt, which results in a saving in both time and effort.

Second, the proposed solution is more accurate. Handwriting tips entry is often prone to error due to human fatigue and mistakes. AI, on the other hand, is more accurate, and this solution has improved the accuracy of tip entry. Traditional OCR technology can also recognize text, but its recognition rate for handwriting is not high. The proposed solution, however, has improved the accuracy of recognizing handwritten tip amounts using the AI-based knowledge.

Third, compared to manual entry of tips, this solution improves productivity. The production efficiency of catering and other service venues is significantly enhanced. Traditional OCR technology can recognize text but cannot recognize tips from the text. Waiters may still need to pick out the tips from it, resulting in low productivity.

Fourth, the proposed solution may reduce frauds. In service industries, there are often employees who engage in irregular operations with tips, resulting in high levels of fraud and corruption. The systems and methods proposed in the present disclosure can automatically identify tips and provide photographic evidence in the form of a receipt, which may help reduce frauds committed by employees.

FIG. 1 is an architecture diagram illustrating an example system 100 used to perform the subject matter described herein, in accordance with some implementations of the present disclosure. As shown in FIG. 1, system 100 may include an image sensor 102, a processing server 104, an OCR server 106, a POS server 108, and a display 110. These components of system 100 may be integrated into a single device or may belong to multiple separate devices coupled together through wired connections, wireless connections, and/or the Internet. Image sensor 102 is an image capturing device, which is configured to take a digital photo or an image of a receipt 114 (also referred to as a slip). For example, image sensor 102 may be a standalone device such as an image scanner. In another example, system 100 may be a mobile device such as a smartphone, a tablet (such as an iPad), or a POS handheld device, and image sensor 102 may be a camera of the mobile device. Image sensor 102 may communicate with and transmit the digital photo or image to processing server 104.

Receipt 114 is a receipt of a transaction between a customer and a merchant, which is usually printed by the merchant using a receipt printer. Receipt 114 may include only text, or may include both text and graphical images depending on capabilities of the receipt printer and/or preferences of the merchant and their payment system. For example, a receipt printer that only supports text printing may generate a receipt that only includes text, and another receipt printer that supports both text and graphical printing may generate a receipt that includes both text and graphical images. Similarly, some merchants may elect to have elaborate and/or detailed receipts including branding images and/or other decoration and ornamentation, while other merchants may elect a simple text-only receipt. Receipt 114 may include a purchase amount. The customer may handwrite a tip amount and another amount for a total (such as a sum of the tip amount and the purchase amount) on receipt 114, such as in specific areas indicated on the receipt for such entries. The customer may also sign the receipt to confirm the handwritten payments and authorize the merchant to charge these payments on the customer' credit card.

System 100 is configured to identify the handwritten amounts (especially the tip amount) the customer wrote on receipt 114. To this end, format of the content of receipt 114 may be pre-defined to meet some requirements. Receipt 114 may include a reference region that serves as a visual aid to help system 100 locate and recognize the handwritten amounts on receipt 114. The format of the reference region (such as its location on receipt 114 and its content) may comply with some pre-configured requirements. Receipts 114 from different merchants may have similar and/or different formats.

Processing server 104 is configured to recognize the content on receipt 114, including printed and handwritten content, through an AI OCR model. Processing server 104 may include a model server 116 that is configured to implement the AI OCR model. After obtaining an image of receipt 114 (which may also be referred to as a receipt image), processing server 104 may adjust the image (such as cropping or rotating), and can then send the adjusted image to the model server for OCR. The purpose of the image adjustment can include correcting distortions of the image so that the adjusted image is more suitable for the recognition by the model server. The distortions may be caused by how the image was scanned or taken. For example, the image might be upside down, rotated 180 degrees clockwise, relatively lighter or darker than expected due to lighting when the image was taken, or skewed because the image was taken at an uneven angle. Fixing the rotation or skew of the image may improve the OCR recognition rate of the model server.

The model server 116 of processing server 104 may process the receipt image or the adjusted image of the receipt 114 using the AI OCR model to determine OCR recognition results. The OCR recognition results may include text (such as words, characters, or numbers) on receipt 114 and position information of the recognized text. An OCR recognition result may also be referred to as a recognition result in the present disclosure.

In some implementations, processing server 104 sends the adjusted image to OCR server 106. OCR server 106 is configured to perform OCR of the adjusted image and return the OCR recognition results of the adjusted image to processing server 104. OCR server 106 can use trained AI models or open-source models for OCR. In some implementations, OCR server 106 may use an Application Programming Interface (API) provided by cloud services, such as Recognize service of Amazon Web Services (AWS).

Processing server 104 may identify amounts of interest (such as the tip amount, the purchase amount, and the total amount) based on the OCR recognition results received from OCR server 106 or the model server of processing server 104. The purchase amount can be a pre-gratuity or pre-tip amount of the transaction. In some implementations, processing server 104 may validate and correct the identified amounts based on one or more pre-defined validation rules. In some implementations, processing server 104 may further identify other transaction related information such as an order number, transaction number, or transaction identifier from the image of receipt 114.

Processing server 104 can support receipts in various pre-defined formats even though the formats may come from different merchants. Processing server 104 and model server 116 can be trained with different pre-defined formats including tip input section layouts for pattern recognition purposes, so that more than one format can be recognized for processing. For example, the tip input can be a sequence layout of the purchase amount, the tip amount, the total amount, and an anchor line or a reference region. In another example, the tip input could be another layout format including a rectangle box, within it containing check boxes of predefined tip amounts and a custom tip written line as an alternative. The expected layout can be trained into model server 116 and programmed into processing server 104, and thus additional layout format patterns can be recognized properly.

Processing server 104 may send the identified amounts (such as the tip amount) to POS server 108, and the POS server 108 can then enter or add the identified amounts into a POS database (not illustrated). Processing server 104 may display information and interact with a user of system 100 (such as an employee of the merchant) through a user interface 112 in display 110. For example, display 110 may be a touchscreen coupled to processing server 104. In some implementations, user interface 112 may display an identified tip amount and an identified total amount to the user for confirmation. In some implementations, after processing server 104 corrects the tip amount based on the pre-defined validation rules, processing server 104 may request the user to confirm the corrected tip and total amounts through user interface 112. The user may manually check and confirm that these amounts are correct using user interface 112 (for example, by pressing a button in user interface 112). Then, processing server 104 may send the confirmed amounts to POS server 108. In some other implementations, processing server 104 may automatically confirm validity of an identified amount when it determines that a confidence level of the identified amount is above a threshold based on AI analysis. In this case, processing server 104 can send the identified amount to POS server 108 without requesting manual confirmation or correction from the user.

In some implementations, after receiving the order number and the tip amount from processing server 104, POS server 108 searches the POS database and finds the transaction information associated with the order number. Display 110 may also be coupled to POS server 108. POS server 108 may use user interface 112 to display the search result to the user and request the user to confirm. POS server 108 may save the tip amount into the POS database after receiving the user's confirmation through user interface 112.

In some implementations, user interface 112 is a POS interface running on a POS handheld device. In some other implementations, user interface 112 is part of a separately developed interface. The separately developed interface may be, or may be associated with, an application that runs on a smart mobile device, such as a smartphone or a tablet.

Figure 2:
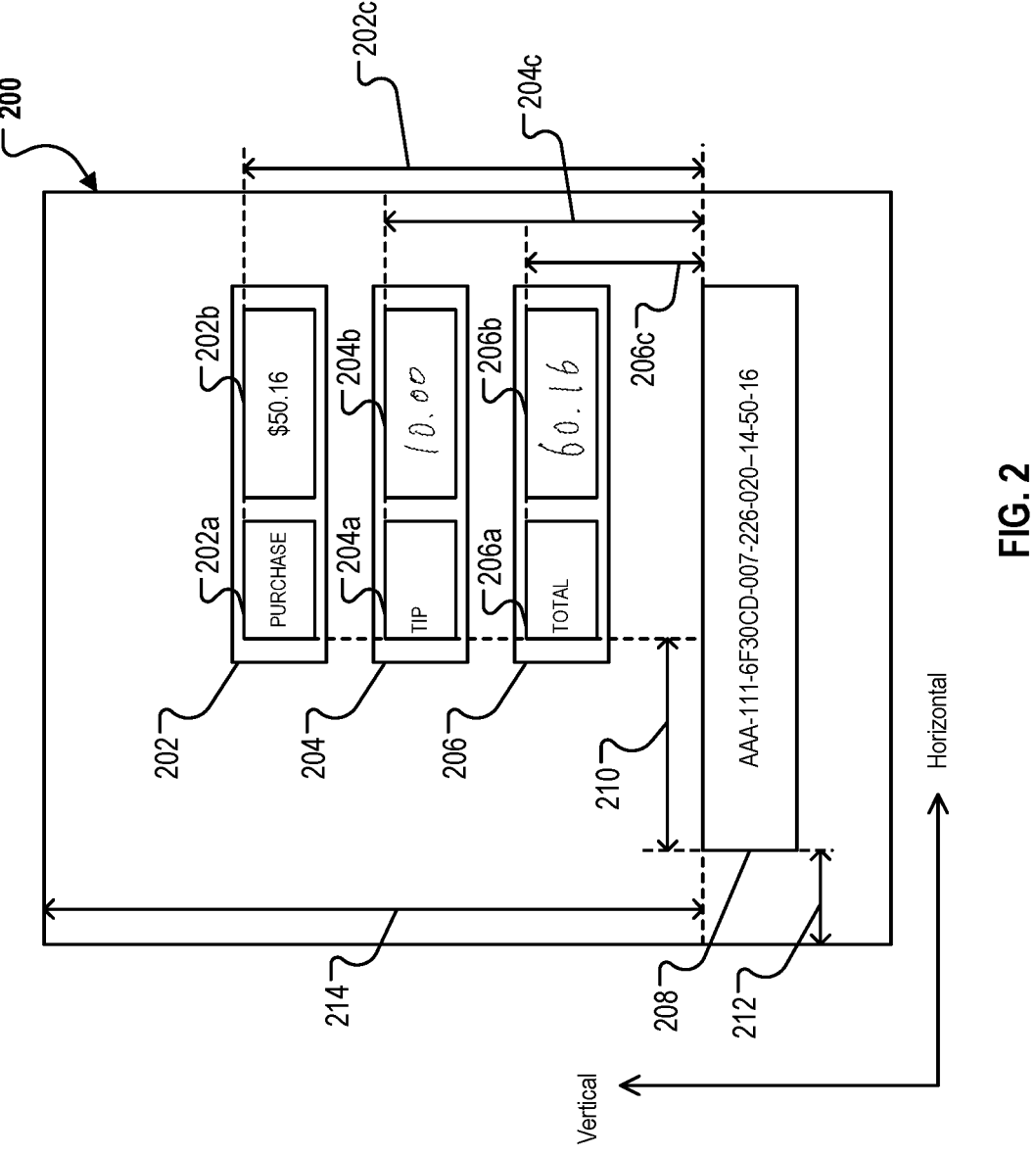
FIG. 2 illustrates an example receipt image in accordance with implementations of the present disclosure.

FIG. 2 illustrates an example receipt image 200 in accordance with some implementations of the present disclosure. Image 200 is an image of a receipt (such as receipt 114 of FIG. 1) for a transaction between a merchant and a customer. Image 200 may be an image of the entire receipt. Alternatively, image 200 may be an image of a portion of the receipt which includes the amounts of concern. As shown in FIG. 2, image 200 includes amount regions 202, 204, and 206 and a reference region 208. Amount region 202 is associated with a "purchase" category and includes a category identifier 202a and an amount 202b following category identifier 202a. Amount 202b represents a purchase price of the transaction. As shown in FIG. 2, category identifier 202a includes printed characters "PURCHASE," and amount 202b includes printed characters "$50.16." Amount region 204 is associated with a "tip" category and includes a category identifier 204a and an amount 204b following category identifier 204a. Amount 204b represents an amount of a tip offered by the customer for the transaction, which may be handwritten by the customer on the receipt. As shown in FIG. 2, category identifier 204a includes printed characters "TIP," and amount 204b includes handwritten characters "10.00," which indicates that the tip amount is $10.00. Amount region 206 is associated with a "total" category and includes a category identifier 206a and an amount 206b following category identifier 206a. Amount 206b represents a total amount to be paid by the customer for the transaction, which may equal a sum of the purchase price and the tip and may also be handwritten by the customer on the receipt. As shown in FIG. 2, category identifier 206a includes printed characters "TOTAL," and amount 206b includes handwritten characters "60.16," which indicates that the total amount is $60.16.

Accurately identifying handwritten amounts (such as amounts 204b and 206b in FIG. 2) on a receipt using the OCR technology may not be easy for various reasons. For example, the customer's handwriting on the receipt may be illegible or sloppy, or the receipt may have stains, which interfere with the OCR and reduce the recognition accuracy. To achieve quicker scan and more accurate handwritten amount recognition, the receipt can include a reference region (such as reference region 208 of FIG. 2).

Reference region 208 can serve as a visual aid or a reference for locating and recognizing amounts 204b and 206b. Reference region 208 may be pre-configured to comply with one or more requirements. The content of reference region 208 may be in a pre-set format. Various formats of reference region 208 can be used in different implementations, including between different vendors, and can include information to easily allow a system (such as system 100 described in relation to FIG. 1) to determine where reference region 208 occurs. In some instances, reference region 208 can include predefined portions or content so that reference region 208 can be initially identified by the system. For example, reference region 208 may start with a series of letters, numbers, or other characters. In one instance, the reference region 208 may start with a keyword or a flag (such as a three-character value of "AAA"). Other suitable starting keywords or flags can also be used. The starting keywords or flags may also be referred to as reference information. The system may locate reference region 208 by searching the reference information. The reference region 208 may include, but is not limited to characters, numbers, or symbols. In another instance, the reference region 208 may include any visual and/or machine-readable image suitable for representing information. For example, the reference region 208 may include a machine-readable code such as a bar code or a two-dimensional code (for example, a QR code). In other instances, the reference region may include a combination of some of the examples described in this disclosure.

In some implementations, reference region 208 includes or may encode transaction information, and can be used as an additional information source. For example, reference region 208 may include an order number of the transaction associated with the receipt. In some instances, a barcode or other encoded portion may be used to reference an associated order number. After OCR recognition, this information can be used to retrieve the order information in the POS system.

In the example illustrated by FIG. 2, reference region 208 includes a character sequence "AAA-111-6F30CD-007-226-020-14-50-16." "AAA" is a flag or a starting keyword (also referred to as reference information). "111" represents an identification (ID) of a store or a merchant. "6F30CD" is a payment ID, and one order may have several payments. "007-226" is an order number. "020-14" is a cashier ID, which identity an employee of the merchant who is associated with this order (such as a waiter or a waitress for a restaurant order). "50-16" represents the purchase amount, which is $50.16. Some parts of the reference region 208 may be coded. The merchant can design coding formats of reference region 208 according to their own needs. In some implementations, to improve the OCR accuracy of the order number, special coding can be applied to avoid easily confused characters such as "o," "0," "I," and "1." For example, Huffman coding or base58 can be used.

Locations of amount regions 202, 204, and 206 and reference region 208 in image 200 may comply with some pre-determined requirements. In some implementations, each of category identifier 202a, 204a, and 206a is located at a pre-determined position relative to reference region 208. The relative location or position may include at least one of a vertical distance (such as distances 202c, 204c, and 206c in FIG. 2) and a horizontal distance (such as distance 210) measured between each category identifier and the reference region. Thus, after identifying reference region 208, the system may locate the amount regions based on the predetermined relative location information between the amount regions (or the category identifiers) and reference region 208.

In some implementations, reference region 208 is located at a pre-determined position in image 200. For example, as shown in FIG. 2, distance 214 is a vertical distance between reference region 208 and the top border of image 200, and distance 212 is a horizontal distance between reference region 208 and the left border of image 200. Distances 212 and 214 may be pre-determined. In some other implementations, for the sake of error tolerance, reference region 208 is located within an area defined by a pre-determined boundary. The system may identify reference region 208 based on its pre-determined location information.

In some implementations, each of amount regions 202, 204, and 206 and reference region 208 is located at a pre-set position or within a pre-set area in image 200.

In some implementations, each of amount regions 202, 204, and 206 and reference region 208 includes a line of text (such as each horizontal line of characters as shown in FIG. 2). Thus, reference region 208 may also be referred to as a reference line or an anchor line. Amount region 202 may be referred to as a purchase line. Amount region 204 may be referred to as a tip line. Amount region 206 may be referred to as a total line.

In some implementations, each of amount regions 202, 204, and 206 includes an underscore drawn under the amounts.

In some implementations, amount 202b includes handwritten characters instead of printed characters. For example, the purchase amount may be written by the employee of the merchant manually.

In some implementations, amount region 204, which is associated with the "tip" category, includes several printed check boxes followed by various tip amount suggestions. For example, amount region 204 can include a box followed by printed text indicating a 15% tip amount suggestion and another box followed by printed text indicating a 20% tip amount suggestion. One of these two boxes has a handwritten check mark on top of it to represent the tip amount offered by the customer.

In some implementations, category identifiers 202a, 204a, and 206a may use any suitable words or character combinations. For example, "AMOUNT," "Amount," "SUBTOTAL," or "subtotal" may also be used as the identifier (such as category identifier 202a) for the "purchase" category. In another example, category identifiers 202a, 204a, and 206a may use words in other languages.

In some implementations, image 200 may include an amount line or an amount region associated with some other categories. For example, image 200 may include a breakdown list of several items the customer purchased in the order. For each item, image 200 may include an amount line that starts with a printed name of the item, which is followed by a printed price of the item. In another example, image 200 may include an amount line associated with a "tax" category, which may include a category identifier "TAX" and a tax amount. In this case, the total amount equals a sum of the purchase amount, the tax amount, and the tip amount.

In some implementations, there is a reasonably sufficient space between reference region 208 and an amount region (such as amount region 206 in FIG. 2). The space between reference region 208 and amount region 206 may either be empty or include pre-determined data as a placeholder. The space helps improve the recognition capability of the system by preventing components of image 200 from being squeezed together and getting too close to each other. For example, there may be a blank space between reference region 208 and amount region 206 associated with the "total" category. The size of the blank space or the distance between reference region 208 and amount region 206 may be pre-defined.

It should be noted that the position of reference region 208 shown in FIG. 2 is for illustration only and that reference region 208 can be located at any suitable position in image 200. For example, instead of being below amount regions 202, 204, and 206, reference region 208 may be located above or in between amount regions 202, 204, and 206. Reference region 208 may be on the top or the sides of image 200.

Figure 3:
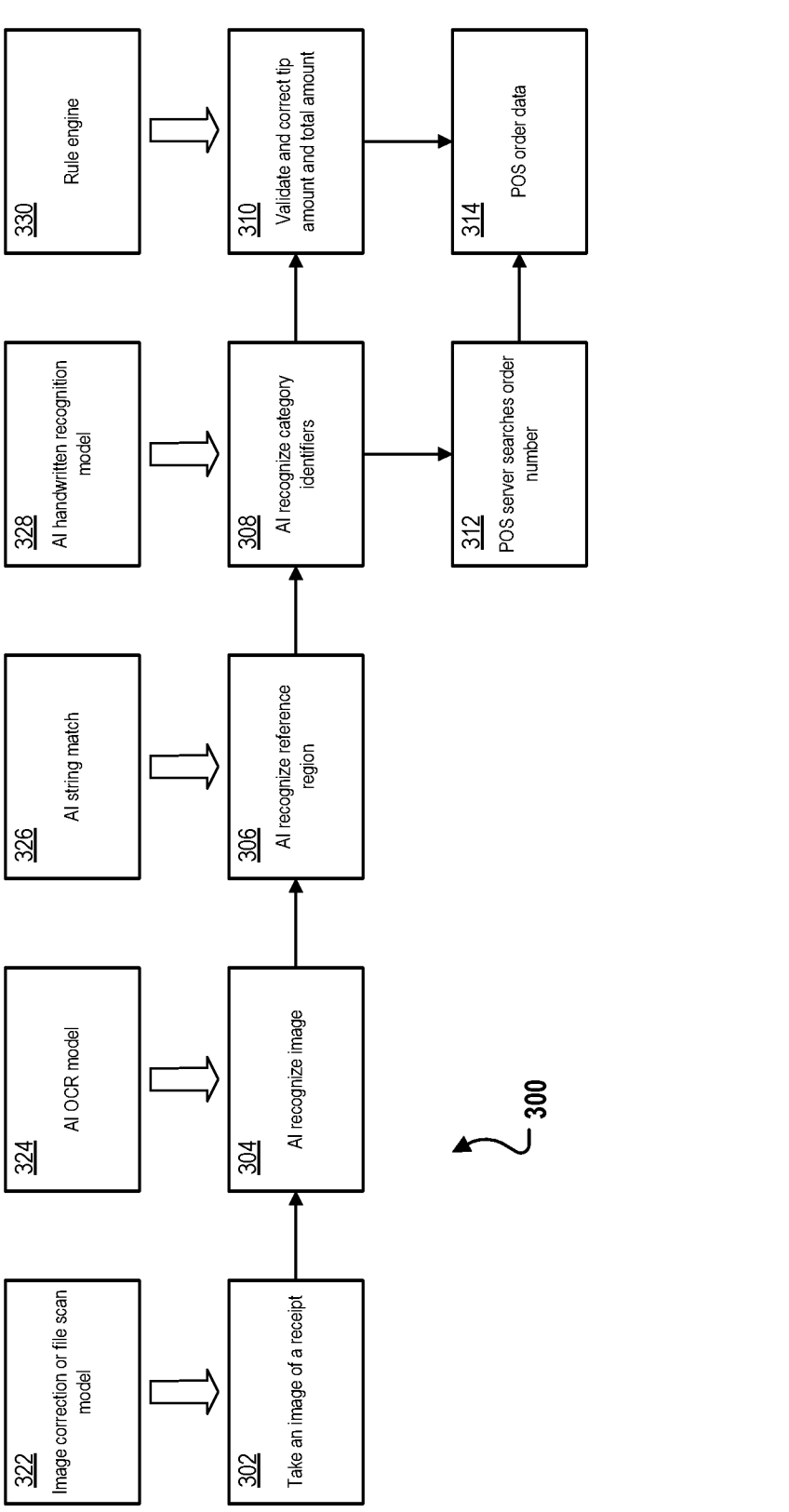
FIG. 3 illustrates an example flowchart, in accordance with implementations of the present disclosure.

FIG. 3 illustrates an example flowchart 300, in accordance with some implementations of the present disclosure. Flowchart 300 can be performed by any suitable system (such as system 100 described in relation to FIG. 1).

At 302, after using a camera to take an image of a receipt, the system may use a correction model 322 to correct or adjust the image for a smoother picture and more uniform printed fonts. Alternatively, an iOS file scan function or some other similar functions can be used to capture the photo. The iOS file scan function is provided by a "Scan Documents" feature of Apple iPhone and iPad devices and also includes the ability to crop and correct a scanned image.

At 304, an AI OCR model 324 is used to recognize all or part of the text on the receipt image, including printed and handwritten text. In some implementations, the AI OCR model 324 may return lines of text and can also provide a position of each text line and a confidence level of a recognition result. In some instances, only a portion of the receipt in a location relative to a reference region (such as reference region 208 of FIG. 2) may be captured by the system at 302. The portion of the receipt may include the reference region. Then the receipt image is subsequently recognized by the system at 304.

At 306, an AI string match algorithm 326 is used to locate the reference region from all recognized characters. For example, the beginning of the reference region can, in some cases, use a sequence of letters or numbers, such as "AAA" as reference information (also referred to as a starting keyword or flag), which makes it easy to perform matching calculations. Other patterns or reference information can be used in alternative implementations. Once the reference region is located, the AI string match algorithm 326 may determine or retrieve a position of the reference region and pass the position of the reference region to the next operation 308.

At 308, positions of amount regions (such as amount region 202, amount region 204, and amount region 206 of FIG. 2) can be determined based on the position of the reference region and the pre-defined relative positions between the amount regions and the reference region. A determination can be made to identify whether a recognition result includes any category identifiers (such as category identifiers 202a, 204a, and 206a of FIG. 2) to confirm the positions of the amount regions. The AI OCR model 324 can be used to recognize the content of an amount region. In some instances, there may be no need to recognize the content again. For example, it may be queried or accessed from the results of the previous operation (such as operations 304 and 306). An AI handwriting recognition model 328 can be used to recognize the content of a handwritten amount (such as amount 204b and amount 206b of FIG. 2) following a category identifier.

The system may determine a tip amount and a total amount (such as amount 204b and amount 206b of FIG. 2), and may then send the tip amount and the total amount to a POS server (such as the POS server 108 of FIG. 2). The POS server then stores the tip amount and the total amount into its order data system. In some implementations, the system may also determine an order number from the receipt image and send the order number along with the tip amount and the total amount to the POS server. For example, the order number may be included in a reference region (such as reference region 208 of FIG. 2) of the receipt image. Then, the POS server (for example, at 312) searches its database to find a transaction that matches the order number. The POS server stores the tip amount and the total amount (for example, at 314) into the database, and then associates the tip amount and the total amount with the transaction.

In some implementations, a set of rules can be used to validate and correct the recognized amounts, which can be referred to as validation rules. The set of validation rules include but are not limited to: a) the Tip amount+the Purchase amount=the Total amount; and b) the Tip amount is less than or equal to the Purchase amount. These rules can be pre-set in the system and described using scripting language to facilitate the editing of the validation rules and the addition of more validation rules at any suitable time. At 310, the system may validate and correct the tip amount and the total amount based on the set of validation rules. The system may send the updated tip amount and total amount to the POS server. The system may also send the corresponding order number to the POS server. At 314, the POS server may store the received information into the POS order data.

Figure 4:
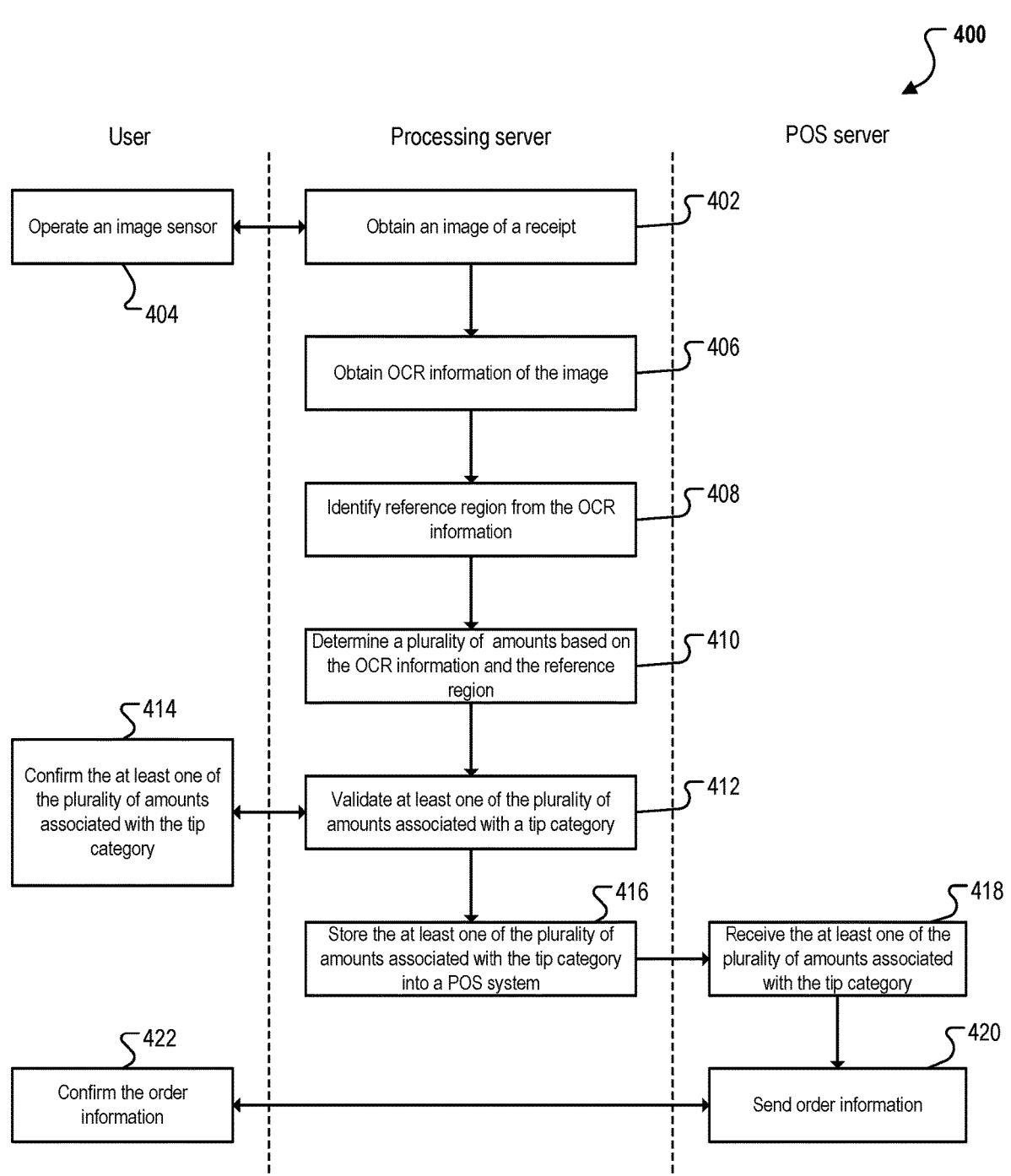
FIG. 4 illustrates a swimlane diagram of an example method, in accordance with implementations of the present disclosure.

FIG. 4 illustrates a swimlane diagram of an example method 400, in accordance with some aspects of the present disclosure. The method 400 can be performed by any suitable system (e.g., system 100 described in relation to FIG. 1) including at least a processing server (e.g., processing server 104 of FIG. 1) and a POS server (e.g., POS server 108 of FIG. 1). At 402, the processing server may obtain an image (e.g., image 200 of FIG. 2) of a receipt (e.g., receipt 114 of FIG. 1) of a transaction between a customer and a merchant. The image includes a reference region (e.g., reference region 208 of FIG. 2), a plurality of category identifiers (e.g., category identifiers 202a, 204a, and 206a of FIG. 2), and at least one set of handwritten characters (e.g., amounts 204b and 206b of FIG. 2). The reference region is in a pre-set format. The reference region and the plurality of category identifiers may be printed. The plurality of category identifiers may be located at pre-set positions relative to the reference region.

In some implementations, the pre-set format of the reference region includes at least one of the following formats and/or characteristics. The reference region may be located at a predetermined position or within a predetermined area in the image. The reference region may include pre-set reference information. For example, the pre-set reference information may include at least one of a sequence of pre-set characters, a sequence of pre-set numbers, or a pre-set machine-readable code. The reference region may include other information related to the transaction, such as an order ID, an ID of the merchant, a payment ID, a cashier ID, and a purchase amount, among other information. The information comprised in the reference region may be coded or encoded to avoid using characters that may confuse the OCR. When coded or encoded, an additional operation of encoded may be used.

In some implementations, the image includes a plurality of amounts (e.g., amounts 202b, 204b, and 206b of FIG. 2) each associated with a respective category. For example, the image may include a purchase amount (e.g., amount 202b)

associated with a purchase category, a tip amount (e.g., amount 204b) associated with a tip category, and a total amount (e.g., amount 206b) associated with a total category. Each of the plurality of amount may follow a category identifier associated with a corresponding category. For example, the image may include a category identifier associated with the tip category, a category identifier associated with the purchase category, and a category identifier associated with the total category.

In some implementations, some amounts are handwritten characters. For example, the at least one set of handwritten characters in the image may include one set of handwritten numbers indicating the tip amount and another set of handwritten numbers indicating the total amount.

In some implementations, a user, who may work for the merchant, operates an image sensor to capture an initial image of the receipt (at an optional operation 404). The processing server may receive the initial image from the image sensor and process or adjust the initial image to correct some undesired distortions of the initial image. The purpose of the adjustment is to make the image more suitable for OCR recognition in the following operations.

At 406, the processing server may obtain OCR information of the image. In some implementations, the processing server may determine the OCR information of the image by processing the image using an AI OCR model (e.g., AI OCR model 324 of FIG. 3). In some implementations, the processing server may send the image to a cloud OCR server (e.g., OCR server 106 of FIG. 1) and receive the OCR information of the image from the cloud OCR server.

In some implementations, the OCR information includes a plurality of recognition results. Each recognition result of the plurality of recognition results includes a set of recognized characters or a machine-readable code. For each recognition result, the OCR information may include a respective position indicating where the recognition result is located and a respective type indicator indicating what type of information the recognition result is (e.g., a set of handwritten characters, a set of printed characters, or a machine-readable code). The OCR information may further include a respective confidence level for each recognition result. The confidence level may be determined by the AI OCR model (e.g., AI OCR model 324 of FIG. 3). The confidence level may vary depending on original content of the recognition result. For example, a set of blurry handwritten characters may have a lower confidence level than a set of printed characters.

At 408, the processing server may identify the reference region from the OCR information based on the pre-set format of the reference region. In some implementations, the processing server selects a recognition result from the plurality of recognition results in the OCR information as the reference region based on whether a position of the recognition result is located at the predetermined position of the reference region or within the predetermined area of the reference region. In some implementations, the processing server selects a recognition result from the plurality of recognition results in the OCR information as the reference region based on whether the recognition result comprises the pre-set reference information in the reference region. In some implementations, the processing server may select a recognition result from the plurality of recognition results in the OCR information as the reference region based on a combination of the selection criteria described above.

The processing server may determine an order number from the OCR information. In some implementations, the order number is located at a predetermined location in the reference region. The processing server may extract the order number from the reference region based on the predetermined location of the order number. In some implementations, to improve the recognition accuracy of the order number, special coding (e.g., Huffman coding or base58 coding) can be applied to avoid easily confused characters such as "o," "0," "I," and "1." Thus, processing server may apply a corresponding decoding procedure to determine the order number.

In some implementations, the processing server may go through the plurality of recognition results in the OCR information and determine the order number based on a pre-set format of the order number. For example, the order number may be a sequence of numeric characters following a predetermined text line such as "Order Number:" or "Order #." In another example, the order number may be a sequence of numeric characters in between some predetermined characters or symbols. Thus, the processing server may determine the order number by identifying a recognition result in the OCR information that matches the pre-set format of the order number.

At 410, the processing server may determine a plurality of amounts based on the OCR information and the reference region. At least one of the plurality of amounts may be associated with the tip category. The objective of operation 410 is to recognize the plurality of amounts included in the receipt image from the plurality of recognition results in the OCR information. For example, the receipt image may include the purchase amount, the tip amount, and the total amount. Some of the plurality of amounts may be represented by handwritten characters in the receipt image. For example, the receipt image may include a set of handwritten numbers indicating the tip amount and another set of handwritten numbers indicating the total amount. The processing server may use an AI handwritten recognition model (e.g., AI handwritten recognition model 328 of FIG. 3) to determine the handwritten tip amount and total amount.

The positions of the plurality of amounts and their formats may follow some patterns. Each of the plurality of amounts may be located close to a corresponding category identifier. For example, an amount may be represented by a sequence of numbers in the same line with a category identifier. The amount may follow the category identifier. The amount may be handwritten (e.g., the tip amount and the total amount) or printed (e.g., the purchase amount) characters depending on which category they are associated with. In addition, each category identifier may be located at a pre-determined position relative to the reference region identified at 408. Therefore, the processing server may identify the plurality of amounts from the plurality of recognition results based on one or more of the following factors.

In some implementations, if a recognition result comprises a set of characters that indicates a number, it is likely that the recognition result includes one of the plurality of amounts.

In some implementations, if a recognition result includes handwritten characters that indicate a number, it is likely that the recognition results include the tip amount or the total amount.

In some implementations, if a recognition result includes printed characters that indicate a number, it is likely that the recognition results include the purchase amount.

In some implementations, a recognition result includes printed tip suggestions. Each tip suggestion may follow a respective checkbox. The recognition result may further include a handwritten symbol indicating that one of the tip suggestions is selected. For example, one of the tip suggestions is selected by a handwritten circle, or there is a handwritten checkmark on top of a checkbox in front of a tip suggestion. In this case, the recognition result likely includes a tip amount indicated by the selected tip suggestion.

In some implementations, the processing server may identify the category identifiers first. The processing server may identify the category identifiers based on a fuzzy judgement using related keywords. For example, the category identifier for the tip category may use keywords like "Tip," "TIP," or "Tip is." In another example, the category identifier for the total category may use keywords like "Total," "Total Amount," or "Total is." If the processing server find a recognition result that includes a keyword related to a category identifier, it is likely that the recognition result includes the category identifier.

In some implementations, the category identifiers may be located at pre-set positions. Thus, if the processing server find a recognition result at the pre-set positions of the category identifiers, then it is likely that the recognition result includes one of the category identifiers.

In some implementations, the processing server may identify the category identifiers based on the pre-set positions of the category identifiers relative to the reference region. For example, the processing server may first determine the position of the reference region at 408. Then the processing server may determine a position of the tip category's identifier based on a relative position of the tip category's identifier with respect to the reference region and the position of the reference region. As a result, if the processing server finds a recognition result at the position of the tip category's identifier, then it is likely that the recognition result includes the tip category's identifier.

In some implementations, if the processing server finds a recognition result follows a category identifier and includes a number, it is likely that the recognition result includes an amount associated with the category identified by the category identifier.

In some implementations, to further increase the recognition accuracy, the processing server may identify the plurality of amounts from the plurality of recognition results of the OCR information based on a combination of two or more of the factors described above. For example, the processing server may first determine a scope or an area that covers the plurality of amounts. The area may be determined based on the position of the reference region and the pre-set positions of the category identifiers relative to the reference region. Then the processing server may select recognition results within the area. In other words, recognition results located outside of the area are filtered out because they are less likely to include the plurality of amounts because of their positions in the image. Thus, the processing server may go through the recognition results within the area and identify whether any of the recognition results within the area includes a keyword related to a category identifier. Once the category identifier is located, the processing server may identify whether another recognition result that includes numeric characters follows the category identifier. The processing server may further use the AI handwritten recognition model to determine whether the numeric characters are handwritten.

In another example, the processing server may first use the AI handwritten recognition model to determine whether two recognition results located close to each other both include handwritten numbers. If so, it is likely that one of the two recognition results includes the tip amount, and another includes the total amount. Then, the processing server may determine if the tip category identifier and the total category identifier occur before the two recognition results, respectively. The processing server may further determine if the tip category identifier and the total category identifier are close to their pre-set positions relative to the reference region.

In some implementations, in addition to the "purchase" category, the "tip" category, and the "total" category, the processing server may determine amounts associated with other categories (e.g., a "tax" category).

At 412, the processing server may validate the at least one of the plurality of amounts associated with the tip category based on at least one of a set of validation rules. In some implementations, the amounts handwritten by customers (e.g., the tip amount and the total amount) may be messy, unclear, or may use non-standard lettering. Validation and correction can be applied to improve the accuracy of the OCR recognition results. The set of validation rules describe relationships between the plurality of amounts if the plurality of amount is recognized by the processing server correctly. On the other hand, an incorrect amount caused by inaccurate recognition may cause the plurality of amounts to violate at least one of the set of validation rules. Once detecting such a violation, the processing server may make adjustment to the plurality of amounts based on the set of validation rules. This way, recognition errors may be corrected. The set of validation rules can be pre-set in the system and described using scripting language to facilitate the addition or editing of rules at any suitable time. The following are some examples of validation rules.

In some implementations, the purchase amount, the tip amount, and the total amount are larger than zero.

In some implementations, the purchase amount plus the tip amount equals the total amount.

In some implementations, the tip amount is within a threshold percentage of the purchase amount.

In some implementations, the tip amount is less than or equal to the purchase amount.

In some implementations, the processing server may automatically correct the plurality of amounts upon determining that at least one of the set of validation rules has been violated. For example, the processing server may first recognize that the purchase amount is $10, the tip amount is $5, and the total amount is $12. In this case, one of the above validation rules is violated because the sum of the purchase amount and the tip amount ($15) is larger than the total amount ($12). The processing server may detect the violation and adjust the tip amount based on the total amount and the purchase amount. That is, the processing server may determine that the tip amount is not accurate and update the tip amount using (the total amount–the purchase amount), which is $2.

In some implementations, the processing server may request a manual confirmation or an adjustment from a user upon determining that at least one of the set of validation rules has been violated. For example, the processing server may determine that the tip amount is larger than a threshold percentage (e.g., 60%) of the purchase amount or exceeds the purchase amount. In this case, a validation rule is violated, but that doesn't necessarily mean there is a recognition error in the tip amount. The violation may occur because the customer of this order is a generous tipper. Thus, instead of automatically adjust the tip amount, the processing server may request a manual confirmation from a user (e.g., a cashier of a restaurant). The processing server may show the user the receipt image, the violation, and the recognized amounts. Then the user can manually check the receipt image. The processing server may interact with the user through a display (e.g., display 110 of FIG. 1) and a user interface (e.g., user interface 112 of FIG. 1).

In some implementations, the processing server may determine whether to validate a recognized amount and whether to request the manual user confirmation or adjustment based on a reliability of the recognized amount. The reliability may be a confidence level associated with the recognized amount and may be determined by an AI OCR model (e.g., AI OCR model 324 of FIG. 3). For example, a printed purchase amount may have a high confidence level. Thus, the processing server may assume the printed purchase amount is accurate and choose not to validate it. On the other hand, a tip amount and a total amount usually are handwritten and have a low confidence level, and the processing server may choose to validate the tip amount and the total amount based on the aforementioned validation rules. In another example, during the validation process, the processing server may determine that a confidence level of a recognized amount is below a threshold and thus request manual confirmation or adjustment by the user. On the other hand, an automatic validation or correction may be applied to the recognized amount if the confidence level of the recognized amount is above the threshold.

Optionally, at 414, the user may confirm the at least one of the plurality of amounts associated with the tip category. The user may confirm the tip amount or both the tip amount and the total amount depending on which amounts the processing server requests a manual confirmation for. The user may confirm that the amounts are correct, or the user may determine that there is a recognition error and correct the inaccurate amount using the user interface.

At 416, the processing server may store the at least one of the plurality of amounts associated with the tip category into a POS system. In some implementations, the processing server sends the tip amount to the POS system. In some implementations, the processing server sends both the tip amount and the total amount to the POS system. In some implementations, the processing server also sends the order number to the POS system. In some implementations, the processing server may send some other information recognized from the receipt image to the POS system depending on specific requirements of the merchant.

At 418, the POS server receives the at least one of the plurality of amounts associated with the tip category from the processing server. In some implementations, the POS server receives the tip amount from the processing server. In some implementations, the POS server receives the tip amount, the total amount, and the order number from the processing server. the POS server may save the received information into a database.

Optionally, at 420, the POS server may send order information to the user for confirmation or to notify the user. The POS server may find a corresponding order or transaction by searching the database using the order number received from the processing server. The order information may include the order number, the tip amount, the total amount, or any other suitable information related to the order. In some implementations, the POS server may send the order information to the user interface for the user's confirmation. Optionally, at 422, the user may confirm the order information through the user interface. After receiving the confirmation, the POS server may save the tip amount into the database. In some implementations, the order information may be a notification of the order and tip information. The order information may be presented at the user interface for a time period depending on system settings.

In some implementations, the confirmation at 422 can be made directly on an interface provided by the POS server. In some other implementations, the processing server and the display are integrated into a mobile device, and the POS server may be a cloud server connected to the mobile device through a wireless connection or Internet. That is, the confirmation at 422 is performed on a separately developed interface on the mobile device. In this case, the POS server may send the order information to the processing server on the mobile device. Then, the mobile device may display the order information to the user through the user interface and relay the user's confirmation back to the POS server.

Figure 5:
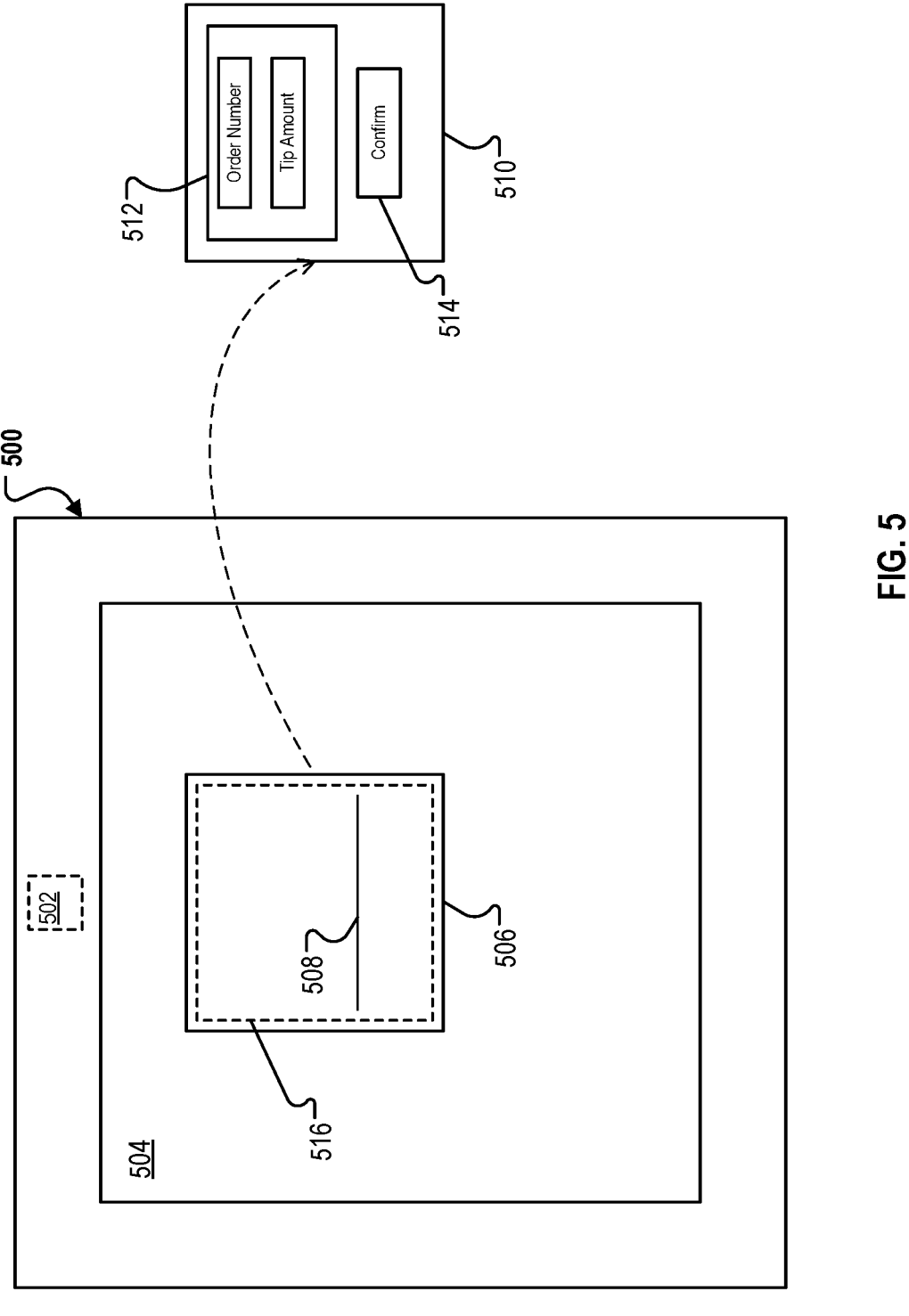
FIG. 5 illustrates an example device, in accordance with implementations of the present disclosure.

FIG. 5 illustrates a front view of an example device 500 for implementing the proposed methods, in accordance with some implementations of the present disclosure. Device 500 may be a handheld device operable by a user who works for a merchant. Device 500 may include but is not limited to a POS device. For example, device 500 may be a mobile device (a smart phone or a tablet) that runs an application that is developed to implement the proposed systems and methods.

Device 500 includes a camera 502 and a display (also referred to as a display screen) 504. A processing server (e.g., processing server 104 of FIG. 1) is located within device 500 and controls camera 502 and display 504. Camera 502 may be located on the back of device 500, and display 504 may be on the front of device 500. In some implementations, camera 502 and display 504 may belong to separate devices. Camera 502 may be aligned with a receipt and take an image of the receipt. Camera 502 may be an auto-focus camera, which can take the image in a faster speed and increase the quality of the image (e.g., causing less blur in the image). Device 500 may display a user interface 506 on display 504 when taking the receipt image. User interface 506 may display a real-time image 516 of the receipt captured by camera 502. Real-time image 516 may be used for observing purposes and for adjusting the position of the receipt. User interface 506 may display an aiding marker 508 on top of real-time image 516. Aiding marker 508 may help remind the user to align the aiding marker 508 with a reference region on the receipt. This way the captured image has a better angle or has less distortion, which may improve the recognition accuracy. In addition, align the aiding marker 508 with the reference region may help the user include the amounts of interest (e.g., the tip amount, the purchase amount, and the total amount) within the image because these amount regions may be located at pre-set positions relative to the reference region. The other error prone information in the receipt, which is not related to the amounts of interest and may cause interference during the OCR, may be excluded. Aiding marker 508 may be at a fixed position in user interface 506. Aiding marker 508 may use any suitable shapes and color such as a green line horizontal line or a yellow box.

In some implementations, the processing server may control camera 502 to automatically take an image without the user manually operating camera 502. The user can hold and hover device 500 above the receipt while camera 502 keeps scanning the receipt and looking for the reference region in real-time image 516. The user can adjust the position of device 500 with help of the aiding marker 508 to include the reference region and the amounts of interest in real-time image 516. Once camera 502 detects the reference region, it can take the image and submit the image to the processing server. This automatic image taking mechanism may prevent the user from making mistakes and not capturing a proper section of the receipt.

Device 500 may display another user interface 510 on display 504 when confirming the tip amount with the user. User interface 510 is also referred to as a confirmation window, which includes order information. User interface 510 can be used at operation 422 to display the order information to the user. The order information may include an order number and a tip amount. The order information may further include a total amount and any other information related to the order. User interface 510 may include a confirm button 514. After the user clicks confirm button 514, the tip amount will be saved into a POS database. User interface 510 may allow the user to edit or modify the tip amount and the total amount if the user finds a recognition error. In some implementations, after the user modified an amount, the amount will be marked as "corrected" and then will be stored in the POS database.

In some implementations, the image of the receipt will be stored in the POS database if the user modifies a recognized amount through user interface 510. Alternatively, the image of the receipt may be stored in the POS database regardless of whether the user modifies the recognized amount. The proposed systems and methods may prevent the user from making mistakes or committing frauds by increasing the tip amount the user received. First, a recognized tip amount may be stored automatically, which gives the user no chance to enter or modify the tip amount and commit the fraud. Second, the user may go through a manual confirmation or adjustment process through user interface 510 to override the recognized tip amount, which will leave a record. When there is a dispute regarding the tip amount, the merchant can inspect the record and find the image that has the handwritten tip amount and the overriding history of the user. This way, potential user frauds or mistakes can be eliminated or mitigated.

In some implementations, user interface 510 can be used at operation 414 to display the at least one of the plurality of amounts associated with the tip category to the user for validation and correction purposes. For example, user interface 510 may include confirm button 514 and the tip amount. The user can click confirm button 514 if the tip amount is correct. The user may validate or correct the tip amount through user interface 510 if the user finds a recognition error. User interface 510 may further include the total amount or any other amount that can be validated by the user. At operation 414, user interface 510 may or may not include the order number.

In some implementations, device 500 may be set to a "No Confirmation" or "No Confirmation Needed" mode, the recognized amounts may be stored in the POS database automatically, and then user interface 506 may refresh, which allows the user to continue capturing and recognizing the next receipt. The user may not perform any device operations during recognition process of multiple receipts. In some implementations, device 500 may be set to a "Need Confirmation for Low Confidence Recognition" mode, and user interface 510 may pop up automatically when device 500 identifies that one of the recognized amounts has a low confidence level.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the different functions can be implemented using "engines," which broadly refer to software-based systems, subsystems, or processes that are programmed to perform one or more specific functions. Generally, an engine is implemented as one or more software modules or components, installed on one or more computers, in one or more locations. In some cases, one or more computers can be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing models described in this specification can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any disclosure or on the scope of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claim in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method, comprising:
   obtaining an image of a receipt, wherein the image comprises a reference region in a pre-set format, a plurality of category identifiers, and at least one set of handwritten characters, wherein the reference region and the plurality of category identifiers are printed, and wherein the plurality of category identifiers is located at pre-set positions relative to the reference region;
   obtaining optical character recognition (OCR) information of the image;

identifying the reference region from the OCR information based on the pre-set format of the reference region;

determining a plurality of amounts based on the OCR information and the reference region, wherein at least one of the plurality of amounts is associated with a tip category;

validating the at least one of the plurality of amounts associated with the tip category based on at least one of a set of validation rules wherein the set of validation rules require (1) a purchase amount, a tip amount, and a total amount that are larger than zero, (2) the purchase amount plus the tip amount equals the total amount, and (3) the tip amount is within a threshold percentage of the purchase amount; and storing the at least one of the plurality of amounts associated with the tip category into a point of sale (POS) system.

2. The method according to claim 1, wherein the obtaining OCR information of the image comprises one of the following:

determining the OCR information of the image by processing the image using an artificial intelligence (AI) OCR model; or sending the image to a cloud OCR server and receiving the OCR information of the image from the cloud OCR server.

3. The method according to claim 1, wherein the OCR information comprises a plurality of recognition results, wherein each recognition result of the plurality of recognition results includes a set of recognized characters or a machine-readable code, and wherein the OCR information further comprises a position, a confidence level, and a type indicator for each recognition result of the plurality of recognition results.

4. The method according to claim 3, wherein the pre-set format comprises at least one of the following:

the reference region is located at a predetermined position or within a predetermined area in the image; or the reference region comprises pre-set reference information, wherein the pre-set reference information comprises at least one of a sequence of pre-set characters, a sequence of pre-set numbers, or a pre-set machine-readable code.

5. The method according to claim 4, wherein identifying the reference region from the OCR information comprises selecting a recognition result from the plurality of recognition results as the reference region based on at least one of:

whether the recognition result is located at the predetermined position or within the predetermined area corresponding to the reference region; or whether the recognition result comprises the pre-set reference information corresponding to the reference region.

6. The method according to claim 3, wherein the determining a plurality of amounts comprises:

identifying each category identifier of the plurality of category identifiers from the OCR information; and for each category identifier, determining an amount associated with the category identifier by selecting a recognition result from the plurality of recognition results based on at least one of the following:

whether the recognition result comprises a set of characters indicating a number;

whether the recognition result comprises multiple printed tip suggestions and a handwritten symbol indicating that one of the multiple printed tip suggestions is selected;

whether the recognition result is handwritten;

whether the recognition result is within a region determined based on a position of the reference region and the pre-set positions of the plurality of category identifiers relative to the reference region; or whether a distance between the recognition result and the category identifier is less than a threshold.

7. The method according to claim 1, wherein the plurality of amounts comprises:

the tip amount associated with the tip category;

the purchase amount associated with a purchase category; and the total amount associated with a total category.

8. The method according to claim 7, wherein the plurality of category identifiers comprises:

a category identifier of the tip category;

a category identifier of the purchase category; and a category identifier of the total category.

9. The method according to claim 8, wherein the at least one set of handwritten characters comprises a first set of handwritten numbers indicating the tip amount and a second set of handwritten numbers indicating the total amount.

10. The method according to claim 1, further comprising:

requesting a manual confirmation upon determining that the tip amount exceeds the threshold percentage of the purchase amount.

11. The method according to claim 10, wherein the requesting a manual confirmation comprises:

sending the purchase amount, the tip amount, and the total amount to a user interface; and receiving the manual confirmation from the user interface.

12. The method according to claim 10, wherein the validating the at least one of the plurality of amounts associated with the tip category based on at least one of a set of validation rules comprises:

updating the tip amount upon determining that the plurality of amounts violates at least one of the set of validation rules.

13. The method according to claim 12, wherein the updating the tip amount comprises updating the tip amount as the total amount subtracted by the purchase amount.

14. The method according to claim 1, wherein the determining a plurality of amounts further comprises determining a confidence level of the tip amount, wherein the validating the at least one of the plurality of amounts associated with the tip category further comprises updating the confidence level of the tip amount, and wherein the method further comprises:

sending the tip amount to a user interface for confirmation in response to determining that the confidence level of the tip amount is below a threshold; and updating the tip amount based on feedback received from the user interface.

15. The method according to claim 1, wherein the reference region further comprises an order number, and wherein the storing the at least one of the plurality of amounts associated with the tip category into a POS system comprises:

storing the tip amount and the order number into the POS system.

16. The method according to claim 1, wherein the obtaining an image of a receipt comprises:

taking an initial digital image of the receipt using a camera or a scanner; and processing the initial digital image by correcting a distortion of the initial digital image to determine the image.

17. A merchant system comprising:

at least one processor; and at least one memory coupled to the at least one processor and storing programming instructions for execution by the at least one processor to cause the merchant system to perform operations comprising:

obtaining an image of a receipt, wherein the image comprises a reference region in a pre-set format, a plurality of category identifiers, and at least one set of handwritten characters, wherein the reference region and the plurality of category identifiers are printed, and wherein the plurality of category identifiers is located at pre-set positions relative to the reference region;

obtaining optical character recognition (OCR) information of the image;

identifying the reference region from the OCR information based on the pre-set format of the reference region;

determining a plurality of amounts based on the OCR information and the reference region, wherein at least one of the plurality of amounts is associated with a tip category;

validating the at least one of the plurality of amounts associated with the tip category based on at least one of a set of validation rules wherein the set of validation rules require (1) a purchase amount, a tip amount, and a total amount that are larger than zero, (2) the purchase amount plus the tip amount equals the total amount, and (3) the tip amount is within a threshold percentage of the purchase amount; and storing the at least one of the plurality of amounts associated with the tip category into a point of sale (POS) system.

18. The merchant system according to claim 17, wherein the obtaining OCR information of the image comprises one of the following:

determining the OCR information of the image by processing the image using an artificial intelligence (AI) OCR model; or sending the image to a cloud OCR server and receiving the OCR information of the image from the cloud OCR server.

19. A non-transitory computer storage medium, wherein the non-transitory computer storage medium is coupled to at least one processor of a merchant system and stores programming instructions for execution by the at least one processor to cause the merchant system to perform operations comprising:

obtaining an image of a receipt, wherein the image comprises a reference region in a pre-set format, a plurality of category identifiers, and at least one set of handwritten characters, wherein the reference region and the plurality of category identifiers are printed, and wherein the plurality of category identifiers is located at pre-set positions relative to the reference region;

obtaining optical character recognition (OCR) information of the image;

identifying the reference region from the OCR information based on the pre-set format of the reference region;

determining a plurality of amounts based on the OCR information and the reference region, wherein at least one of the plurality of amounts is associated with a tip category;

validating the at least one of the plurality of amounts associated with the tip category based on at least one of a set of validation rules wherein the set of validation rules require (1) a purchase amount, a tip amount, and a total amount that are larger than zero, (2) the purchase amount plus the tip amount equals the total amount, and (3) the tip amount is within a threshold percentage of the purchase amount; and storing the at least one of the plurality of amounts associated with the tip category into a point of sale (POS) system.

* * * * *